Patented Dec. 23, 1941

2,267,309

UNITED STATES PATENT OFFICE 2,267,309

PROCESS FOR IMPROVING THE STABILITY OF NITROPARAFFINS

Murray Senkus, Terre Haute, Ind., assignor to Commercial Solvents Corporation, Terre Haute, Ind., a corporation of Maryland No Drawing. Application February 12, 1940, Serial No. 318,629

8 Claims. (Cl. 202—57)

My invention relates to the heat stabilization of nitroparaffins, and more specifically to the stabilization of nitroparaffins against thermal decomposition under conditions encountered in the distillation of such nitroparaffins.

The nitroparaffins can be produced by the direct vapor phase nitration of paraffin hydrocarbons, as, for example, in accordance with the processes described in U. S. Patents 1,967,667 of H. B. Hass et al., 2,071,122 of H. B. Hass et al., 2,161,475 of G. K. Landon, and 2,164,774 of G. K. Landon. The crude nitroparaffins, obtained by such processes, are commonly purified by distillation, and in the case of nitration products from hydrocarbons containing more than one carbon atom, the mixed nitroparaffins obtained are separated by fractional distillation.

In attempting to distill the crude nitrated products at atmospheric pressure, thermal decomposition is encountered, and a colored distillate is obtained. This thermal decomposition appears to be accelerated by certain materials with which the nitrated products may be in contact. Thus, worse decomposition is encountered in stainless steel apparatus than in glass, and still worse in aluminum apparatus. This thermal decomposition can be reduced to some extent by preliminary steam distillation of the crude product, and can be further reduced by effecting the final distillation or fractionation under reduced pressure, and hence at a lower temperature. However, reduced pressure operation is more expensive, and requires larger apparatus for a given volume of material distilled, and is hence undesirable from a commercial standpoint.

The purified nitroparaffins obtained by fractional distillation are also subject to thermal decomposition, although to a considerably less degree than the crude nitroparaffins. Here, again, it is usually disadvantageous to have to resort to reduced pressure in an attempt to minimize the decomposition.

I have now discovered that the thermal stability of the nitroparaffins can be materially improved by incorporating therewith small amounts of certain organic anti-oxidants. All anti-oxidants are not operative for this purpose, those having a basic reaction, for example, being actually harmful. The anti-oxidants which I have found to be effective constitute the non-basic organic anti-oxidants having critical oxidation potentials at least as low as the critical oxidation potential of alpha-naphthol. (Critical oxidation potentials for numerous anti-oxidants and a method for determining critical oxidation potentials are reported in an article by L. F. Fieser, J. Amer. Chem. Soc. 52, 5204.) As examples of compounds falling within this category, there may be mentioned alpha-naphthol, catechol, hydroquinone, chlorohydroquinone, nitrohydroquinone, pyrogallol, isoeugenol, and alpha-anthrol.

Among the class of compounds described above, I prefer to employ the phenolic anti-oxidants, and especially the polyhydric phenols such as hydroquinone, catechol, and pyrogallol. I have also found phenolic compounds or mixtures marketed as anti-oxidants under various trade names, such as "Antranox N," and "Santovar A" to be effective stabilizing agents.

All of the anti-oxidants of the class described above are effective in improving substantially the thermal stability of the nitroparaffins. Although an improvement is effected in every case, it may not be sufficient to permanently prevent thermal decomposition, especially if the nitroparaffin is in contact with a metal which tends to accelerate decomposition reactions. Also the various stabilizing agents of this class may be found to differ to some extent in the degree of their effectiveness. Most of the compounds of this class are sufficiently effective to enable steam-distilled crude nitroparaffins to be fractionally distilled over a distillation cycle of 120 hours in glass apparatus, without any apparent thermal decomposition. Compounds which may not be sufficiently effective to enable a distillation to be carried out over such a long period at atmospheric pressure, will nevertheless enable distillation to be carried out at a higher pressure, i. e., at a higher temperature, without thermal decomposition, than would be possible in the absence of such compounds.

The amount of stabilizing agent to be employed may vary over a considerable range, for example, from 0.015%–1.5% based on the weight of the nitroparaffins. In general, I prefer to employ from 0.2%–1.0% by weight. Smaller amounts than those specified above may be effective in some cases, and considerably increased amounts may be employed without any harmful effects. The minimum amount for complete stabilization, under the conditions to be encountered, may of course be determined by preliminary experiments.

The stabilizing agent may simply be added to the nitroparaffins which are to be subjected to elevated temperature. For simple batch distillation, the material may be added to the nitroparaffins in the distillation vessel, and for continuous distillation the stabilizing agent may be added continuously to the feed. In the case of fractional distillation, it is desirable that the liquid nitroparaffins in the fractionating column be in contact with the stabilizing agent, and to effect this end the stabilizing agent can be continuously added to the reflux entering the top of the column, as well as being introduced into the material in the kettle or into the feed in a continuous fractionation.

The continuous introduction of the stabilizing agent can be carried out by any suitable mechanical means. For example, the stabilizing agent may be introduced by passing the feed or reflux through the solid stabilizing agent, the amount dissolved being controlled by the temperature of the liquid nitroparaffins being passed through the solid material. A wire mesh basket inserted in a suitable vessel in the reflux or feed lines will satisfactorily serve this purpose. Other equivalent means of introducing the stabilizing agent will of course be apparent to those skilled in the art.

My invention may further be illustrated by the following specific examples:

Example I

The crude nitroparaffins obtained by the nitration of propane were steam distilled and the steam-distillate was separated by decantation. The oily layer constituting the crude steam-distilled nitroparaffins was charged into a glass distillation vessel equipped with a glass column packed with glass helices, the column approximating in efficiency a 20-plate bubble-cap column. Approximately 0.015% by weight of hydroquinone was added to the nitroparaffins which were then fractionally distilled to separate low-boiling impurities and to obtain, as purified products, nitromethane, nitroethane, 1-nitropropane and 2-nitropropane. The distillation required 120 hours, and the distillate remained water-white throughout. In a similar distillation without any stabilizing agent, the distillate at the end of 15 hours was distinctly colored as a result of thermal decomposition.

Example II

Steam-distilled crude nitroparaffins from the nitration of propane were fractionated as in Example I in the presence of approximately 0.15% by weight of chlorohydroquinone. The distillation required approximately 120 hours and various cuts of the distillate were in all cases water-white. In a similar distillation in the presence of only 0.07% by weight of chlorohydroquinone, the distillate became colored at the end of 42 hours.

Example III

Steam-distilled crude nitroparaffins from the nitration of propane were fractionally distilled as in Examples I and II, utilizing as stabilizing agents catechol, pyrogallol, and alpha-naphthol in concentrations of approximately 0.3% by weight of the nitroparaffins. In all cases complete fractionations were secured in a cycle of approximately 120 hours, with no appearance of color in the distillates.

It is to be understood, of course, that the above examples are merely illustrative, and do not limit the scope of my invention. Although my invention has particular utility in the prevention of thermal decomposition during distillation of nitroparaffins, it is also applicable to other uses in which nitroparaffins are subjected to elevated temperatures. Likewise, my invention is not to be considered as limited to the particular stabilizing agents or nitroparaffins employed in the above examples. Any of the anti-oxidants of the class previously described may be utilized as stabilizing agents, and these agents may be employed to improve the thermal stability of any of the nitroparaffins. In general it may be said that the use of any equivalents or modifications of procedure which would naturally occur to those skilled in the art, is included in the scope of my invention.

My invention now having been described, what I claim is:

1. A process for improving the thermal stability of nitroparaffins, which comprises incorporating therewith a phenolic anti-oxidant having a critical oxidation potential at least as low as the critical oxidation potential of alpha-naphthol.

2. A process for improving the thermal stability of nitroparaffins, which comprises incorporating therewith hydroquinone.

3. A process for improving the thermal stability of nitroparaffins, which comprises incorporating therewith catechol.

4. A process for improving the thermal stability of nitroparaffins, which comprises incorporating therewith pyrogallol.

5. In a process for the purification of crude nitroparaffins, the steps which comprise steam distilling said nitroparaffins and distilling the resulting steam-distilled nitroparaffins while maintaining the heated liquid nitroparaffins in contact with a phenolic anti-oxidant having a critical oxidation potential at least as low as the critical oxidation potential of alpha-nahthol.

6. In a process for the purification of crude nitroparaffins, the steps which comprise steam distilling said nitroparaffins and distilling the resulting steam-distilled nitroparaffins while maintaining the heated liquid nitroparaffins in contact with hydroquinone.

7. In a process for the purification of crude nitroparaffins, the steps which comprise steam distilling said nitroparaffins and distilling the resulting steam-distilled nitroparaffins while maintaining the heated liquid nitroparaffins in contact with catechol.

8. In a process for the purification of crude nitroparaffins, the steps which comprise steam distilling said nitroparaffins and distilling the resulting steam-distilled nitroparaffins while maintaining the heated liquid nitroparaffins in contact with pyrogallol.

MURRAY SENKUS.